US00RE37237E

(19) United States
(12) Reissued Patent
Lancaster, III et al.

(10) Patent Number: US RE37,237 E
(45) Date of Reissued Patent: Jun. 26, 2001

(54) STRETCH WRAPPING WITH FILM SEVERING

(75) Inventors: Patrick R. Lancaster, III, Louisville, KY (US); Yoram Gordon, Portland, OR (US); Jeff Harrison, Lagrange, KY (US)

(73) Assignee: Lantech, Inc., Louisville, KY (US)

(21) Appl. No.: 09/185,664

(22) Filed: Nov. 4, 1998

Related U.S. Patent Documents

Reissue of:
(64) Patent No.: 5,572,850
Issued: Nov. 12, 1996
Appl. No.: 08/207,467
Filed: Mar. 8, 1994

(51) Int. Cl.[7] ..... B65B 13/04; B65B 41/12; B65B 53/00

(52) U.S. Cl. ..... 53/399; 53/441; 53/556; 53/587; 53/389.3

(58) Field of Search ..... 53/399, 441, 556, 53/587, 588, 389.3

(56) References Cited

U.S. PATENT DOCUMENTS 4,232,501 * 11/1980 Stackhouse ..... 53/399
4,300,326 * 11/1981 Stackhouse ..... 53/211
4,302,920 * 12/1981 Lancaster et al. ..... 53/399
4,545,182 * 10/1985 McDowell ..... 53/556
4,549,388 * 10/1985 Lancaster ..... 53/556
4,735,033 * 4/1988 Stackhouse ..... 53/399
4,738,079 * 4/1988 Lancaster et al. ..... 53/450
4,761,934 * 8/1988 Phillips ..... 53/441
4,779,396 * 10/1988 Stackhouse ..... 53/399
4,917,008 * 4/1990 Van Den Wildenberg ..... 53/556 X
5,014,489 * 5/1991 Terminella et al. ..... 53/556 X
5,161,349 * 11/1992 Lancaster et al. ..... 53/556 X

FOREIGN PATENT DOCUMENTS

038622 * 10/1981 (EP) ..... 53/389.3
2097356 * 11/1982 (GB) .
WO94/22718 * 10/1994 (WO) .

* cited by examiner

*Primary Examiner*—Stephen F. Gerrity
(74) *Attorney, Agent, or Firm*—Finnegan, Henderson, Farabow, Garrett & Dunner, L.L.P.

(57) ABSTRACT

A load of stretch wrap with a sheet of stretch wrap packaging material by feeding a sheet through a stretch wrap dispenser and stretching and dispensing from the dispenser, and providing relative rotation between the dispenser and the load to wrap the stretched sheet around the load. The portion of the sheet is weakened with a sheet weakening device, and sheet is tensioned to break the sheet at the weakened portion.

40 Claims, 6 Drawing Sheets

STRETCH WRAPPING WITH FILM SEVERING

Matter enclosed in heavy brackets [ ] appears in the original patent but forms no part of this reissue specification; matter printed in italics indicates the additions made by reissue.

BACKGROUND OF THE INVENTION

The invention relates to a stretch wrapping operation in which the stretch wrap film is severed after a load is wrapped.

Stretch wrapping processes which are performed on a semiautomatic basis have required an operator to sever the film and secure the trailing end of the film onto the load after the sheet of film web has been wrapped around the load. This generally required the operator to dismount from a forklift truck to perform this operation manually and then remount the forklift truck to remove the load. In some instances, the operator would cut the film with a knife. In other instances, the operator would stick his or her finger through a portion of the film and grasp the film behind that portion to sever the film.

Automated attempts to sever the film have only been effective after the wrapping process has ended and the film is in a relatively stationary position. Such film cutting is typically accomplished with an exposed hot wire which is passed through the film web across its full width. The hot wire is located well outside the roll carriage which forms the stretch wrap dispenser. The exposed hot wire can be hazardous to a careless operator. Also, this approach leaves a very short tail of film web extending from the stretch wrap dispenser which may cause difficulties in having the operator grasp and pull the film web out of the stretch wrap dispenser and attach it to the next load for the next wrapping cycle.

Attempts have been made to snap the film by stopping the film drive motor. These attempts resulted in unreliable and unpredictable situations in which the film broke at undesirable or unpredictable locations within the stretch wrap dispenser, thereby requiring the film to be at least partially pre-threaded.

SUMMARY OF THE INVENTION

According to the invention, a process and apparatus is provided for stretch wrapping a load with a sheet of stretch wrap packaging material. The process involves feeding a sheet through a stretch wrap dispenser and stretching and dispensing the sheet from the dispenser. Relative rotation is provided between the dispenser and the load to wrap the stretch sheet around the load. A portion of the sheet is weakened and the sheet is tensioned to break the sheet at the weakened portion. It is preferable that the weakened portion of the sheet is transported to a position sufficiently downstream of the dispenser to allow a graspable tail of the sheet to extend downstream of the dispenser after the sheet has broken at the weakened portion.

BRIEF DESCRIPTION OF THE DRAWINGS

The accompanying drawings, which are incorporated in and constitute part of the specification, illustrate a presently preferred embodiment of the invention and, together with the general description given above and the detailed description of the preferred embodiment given below, serve to explain the principles of the invention.

DETAILED DESCRIPTION OF THE PREFERRED EMBODIMENT

Reference will now be made in detail to the present preferred embodiment of the invention as illustrated in the accompanying drawings.

Figure 1:
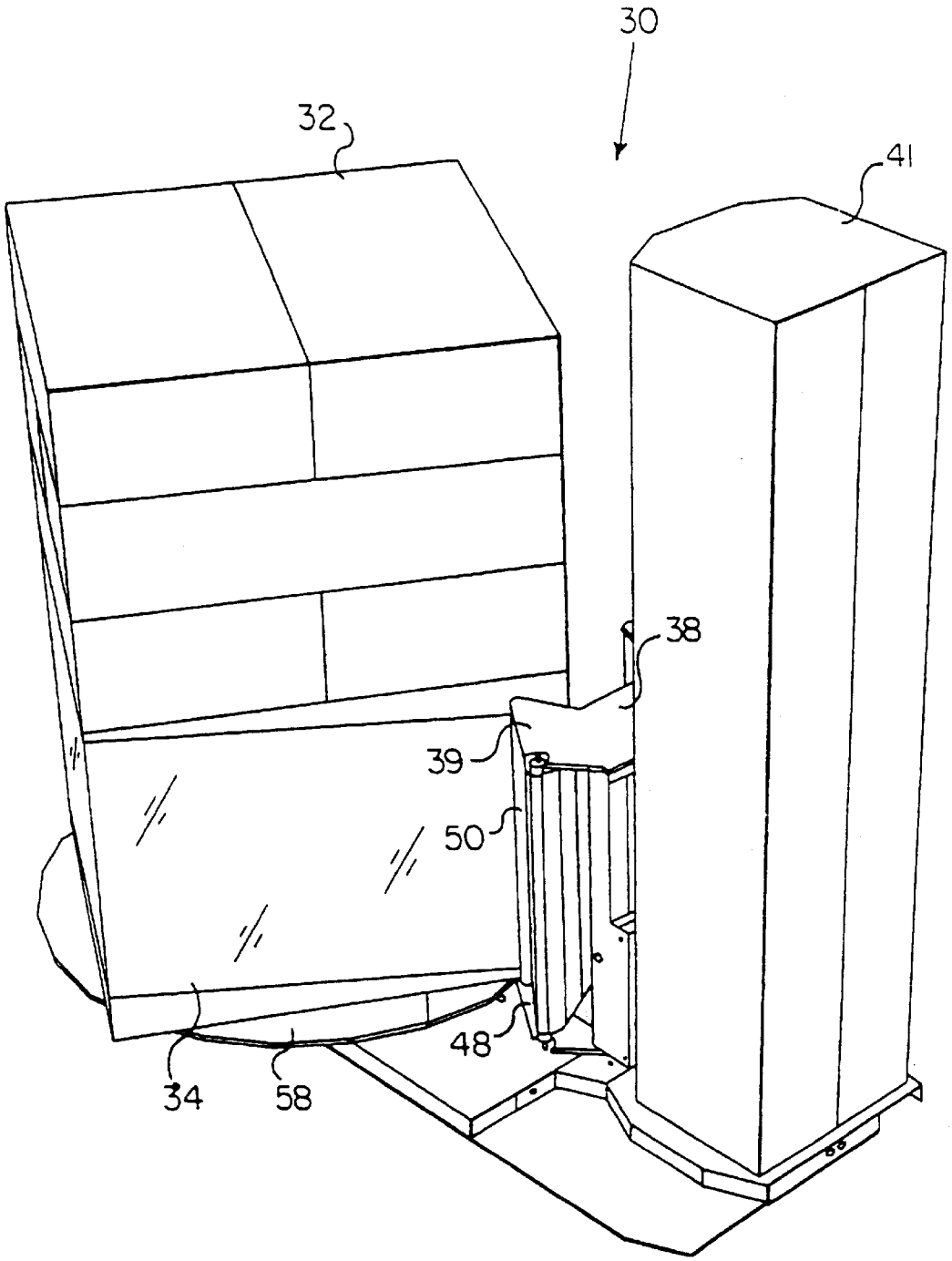
FIG. 1 is a perspective view of an example of a stretch wrapping apparatus which includes the teachings of the present invention.
Figure 2:
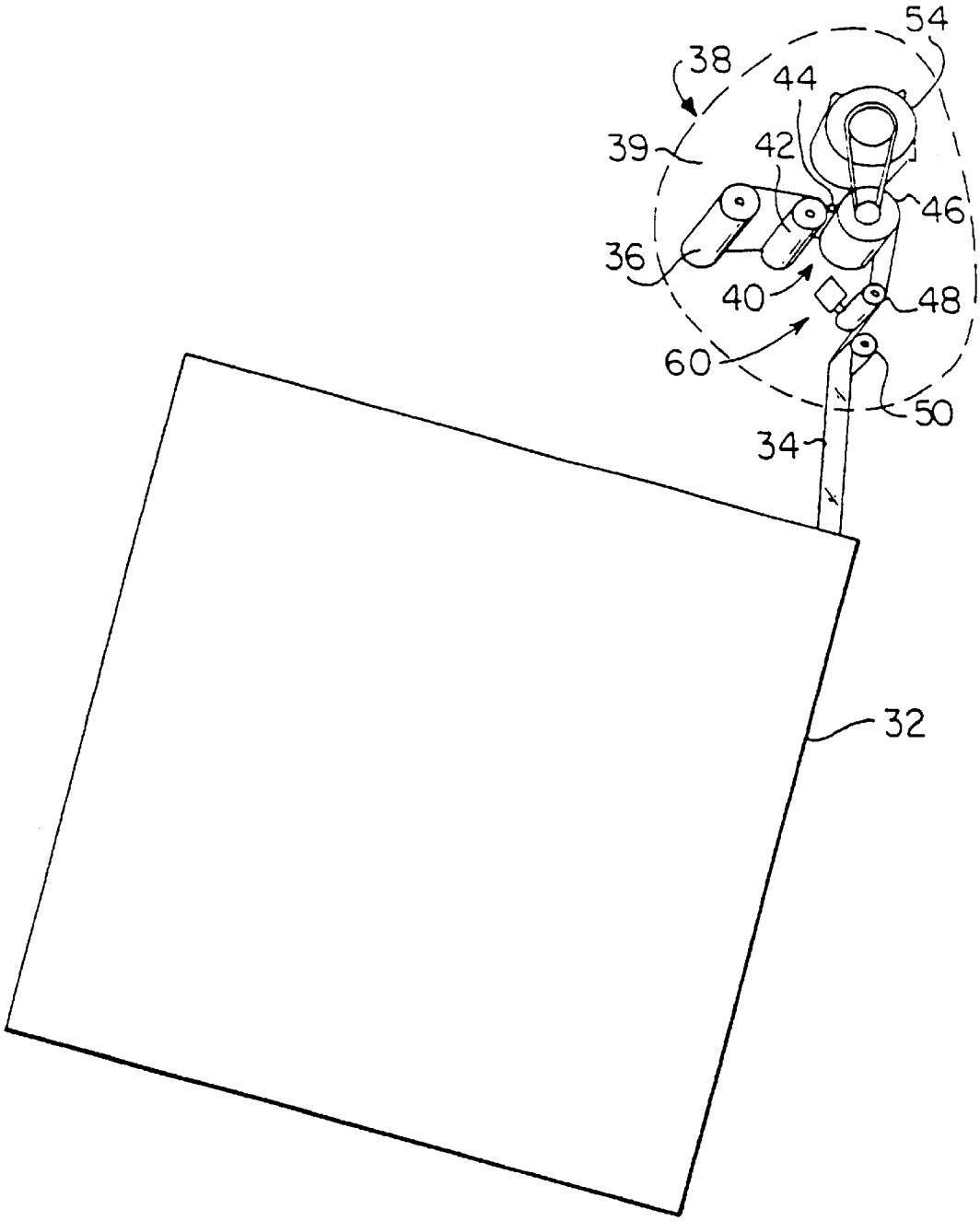
FIG. 2 is a perspective view of the stretch wrapping apparatus of FIG. 1 showing an example of the interior of the stretch wrap dispenser.

As shown in FIG. 1, a stretch wrapping apparatus 30 is provided for stretch wrapping a load 32 with a sheet 34 of stretch wrap packaging material dispensed from a stretch wrap dispenser 38. The stretch wrap dispenser 38 includes a roll carriage having a frame 39 and rollers for feeding and dispensing sheet 34 of film web onto load 32 from film roll 36. As shown in FIG. 2, the roll carriage preferably includes a prestretch portion 40, a support for film roll 36, and dispensing rollers 48 and 50 which are positioned downstream of prestretching portion 40. The roll carriage may include commercially available hinged subassemblies as shown in U.S. patent application Ser. No. 07/611,114, now abandoned which is incorporated herein by reference.

Prestretching portion 40 preferably includes prestretch rollers 42 and 46 and intermediate idler roller 44. Downstream prestretch roller 46 is driven at a faster speed than upstream prestretch roller 42 to prestretch film web 34 in stretch wrap dispenser 38 between prestretch rollers 42 and 46, before dispensing film web 34 from dispenser 38. The relative speed of upstream and downstream prestretch rollers 42 and 46 is preferably provided by a chain and sprocket drive 52 which connects the shafts of those rollers. The surface speed of the rollers, is controlled by a controller 72 which controls the speed and/or actuation of a motor and brake arrangement 54 which is connected to the shafts of prestretch rollers 42 and 46 by a chain and sprocket or belts. A suitable example of a prestretch device is shown and described in greater detail in U.S. patent application Ser. No. 08/051,416 now U.S. Pat. No. 5,414,979, and U.S. Pat. No. 4,302,920, which are incorporated herein by reference. Alternatively, the controller 72 may actuate a brake which slows and stops the rollers that feed the film.

Figure 5:
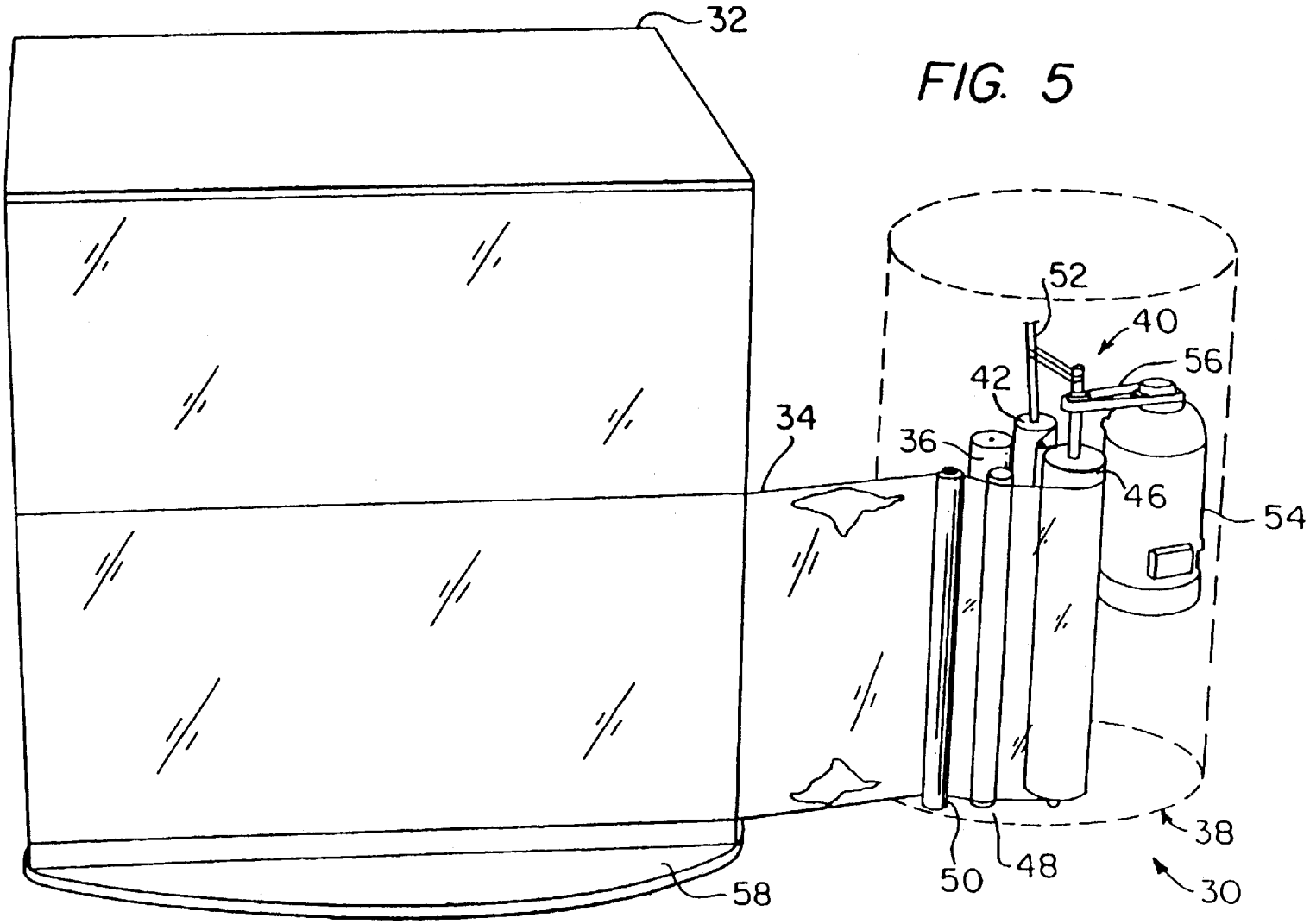
FIG. 5 is a perspective view of the arrangement shown in FIG. 2 from a different angle and at a later period of time than that shown in FIG. 4.

Relative rotation is provided between stretch wrap dispenser 38 and load 32 to wrap the stretched sheet 34 on load 32. As shown in FIGS. 1 and 5, the relative rotation is provided by a conventional motor driven turntable 58 which supports and rotates the load about a vertical axis. Alternative mechanisms for providing relative rotation between dispenser 38 and load 32 include an arm or ring which supports and revolves stretch wrap dispenser 38 around a stationary load 32. Examples of these alternatives may be seen U.S. Pat. No. 5,161,349, which is incorporated herein by reference. As shown in FIG. 1, dispenser 38 may include a mast 41 on which the roll carriage is automatically raised and lowered in a conventional way to spirally wrap load 32.

Figure 4:
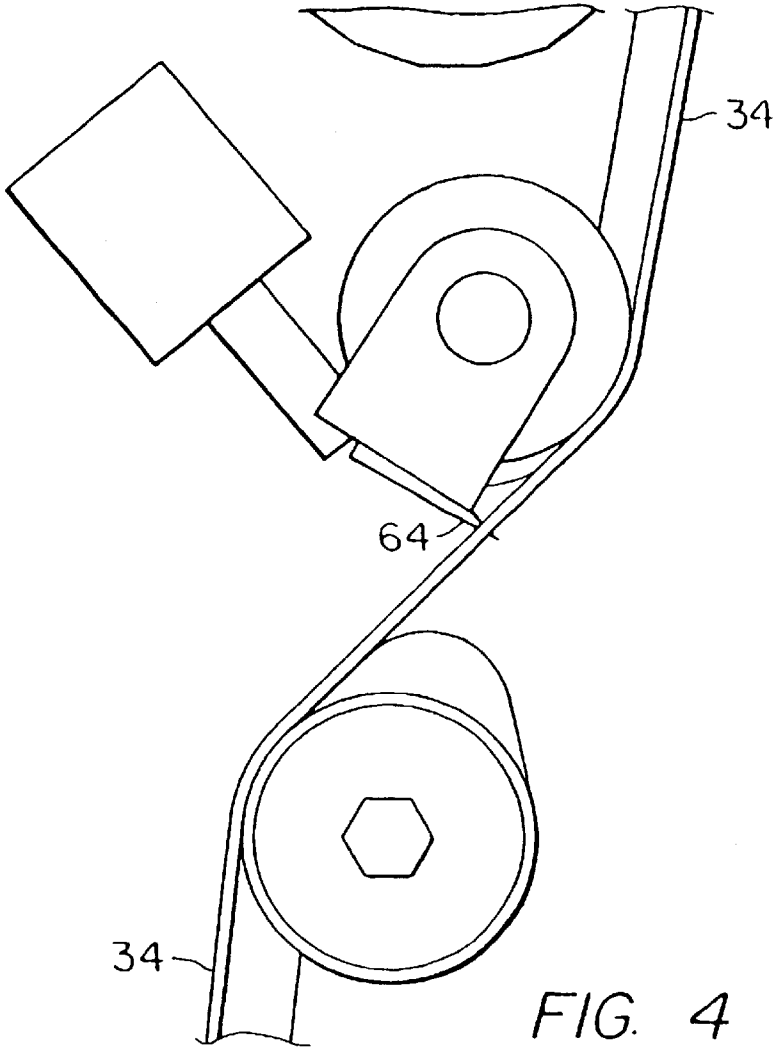
FIG. 4 is a view of the arrangement shown in FIG. 3 at a later point in time.
Figure 3:
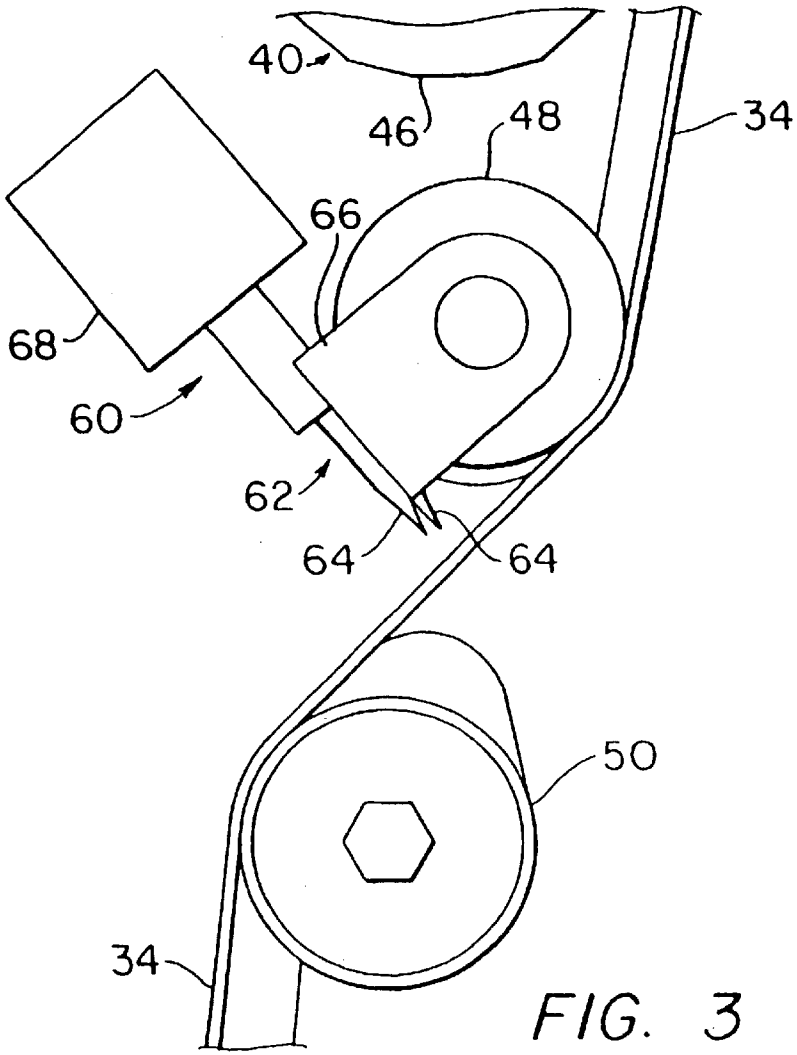
FIG. 3 is an enlarged view of a portion of FIG. 2.

As shown in FIGS. 2–4, a sheet weakening device 60 is positioned between the two dispensing rollers 48 and 50 which are downstream of prestretch portion 40. The sheet weakening device preferably includes a tool such as puncturing device 62 having sharp pins 64 mounted on a U-shaped support 66 that is journalled to rotate about the axis of dispensing roller 48. Puncturing device 62 is electrically activated by electric solenoid 68. When solenoid 68 is activated, the puncturing device 62 moves from the non-engaged position shown in FIG. 3 to the position to the FIG. 4 where pins 64 engage and puncture the film web 34. The puncturing device 62 is then retracted back to the non-engaged position. Depending on the application, the sheet weakening device may be located at other positions. In addition, the sheet weakening device could be mechanically activated, such that it is cocked and released through a camming action.

While the weakening tool preferably includes pins 64 which puncture the sheet in a plurality of places across the sheet in positions proximate to each edge of the sheet, other alternatives for the weakening tool include a high friction knuckle of material such a polyurethane. It may be possible that non-mechanical weakening devices may be employed to perforate or weaken the sheet, such as an electric arc perforation shown in U.S. Pat. No. 4,765,120 which is incorporated herein by reference.

Figure 7:
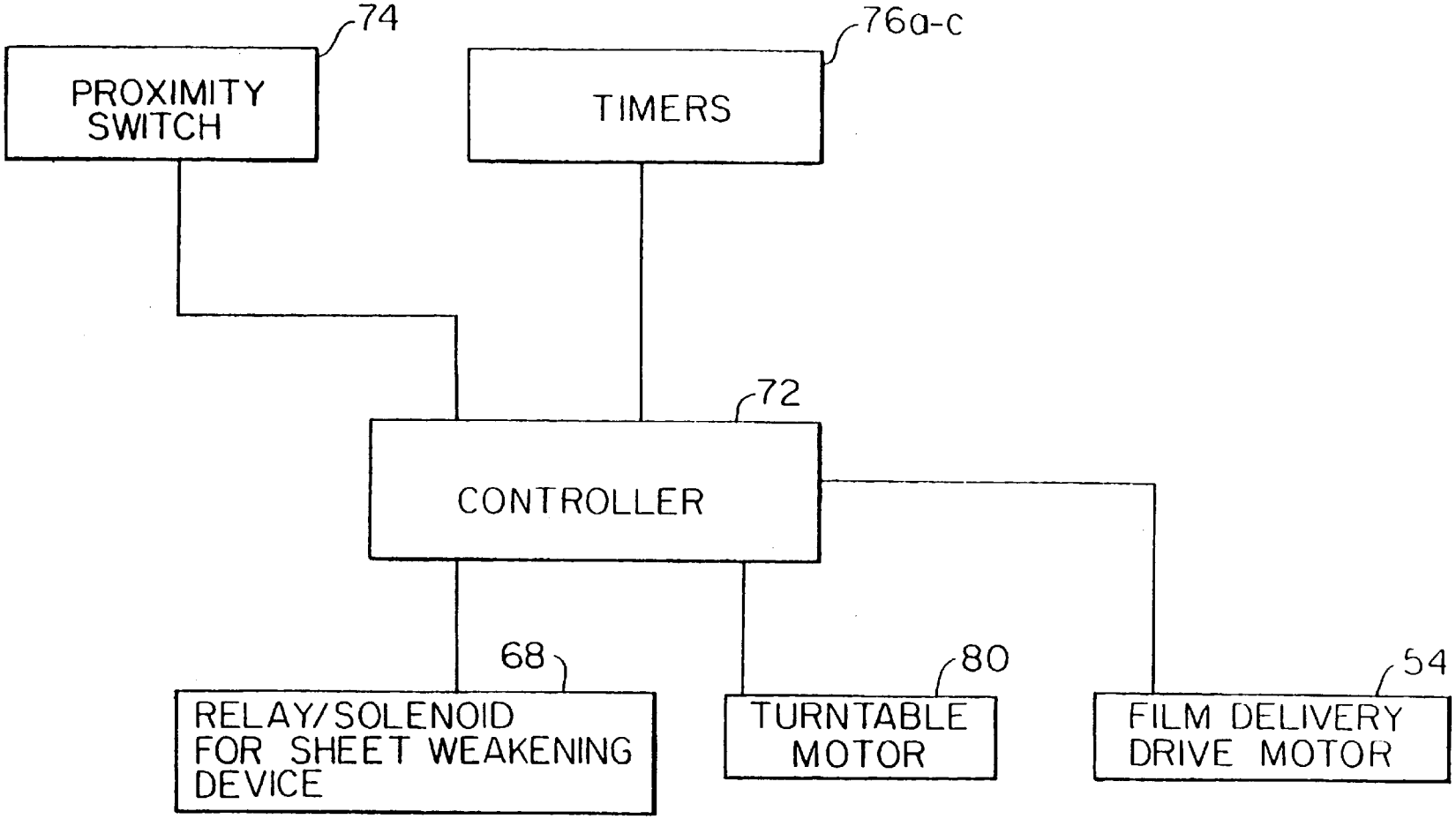
FIG. 7 is a block control diagram.

The weakening step preferably includes electronically controlling the actuation of a weakening tool. Depending on the application, the controller 72 can be any of a number of control devices such as a programmable micro-controller or relay logic. The controller can actuate the weakening tool in response to input from a proximity switch which counts revolutions of the load relative to the film dispenser, or a timer that can be preset by the operator. An exemplary block control diagram is shown in FIG. 7.

Figure 6:
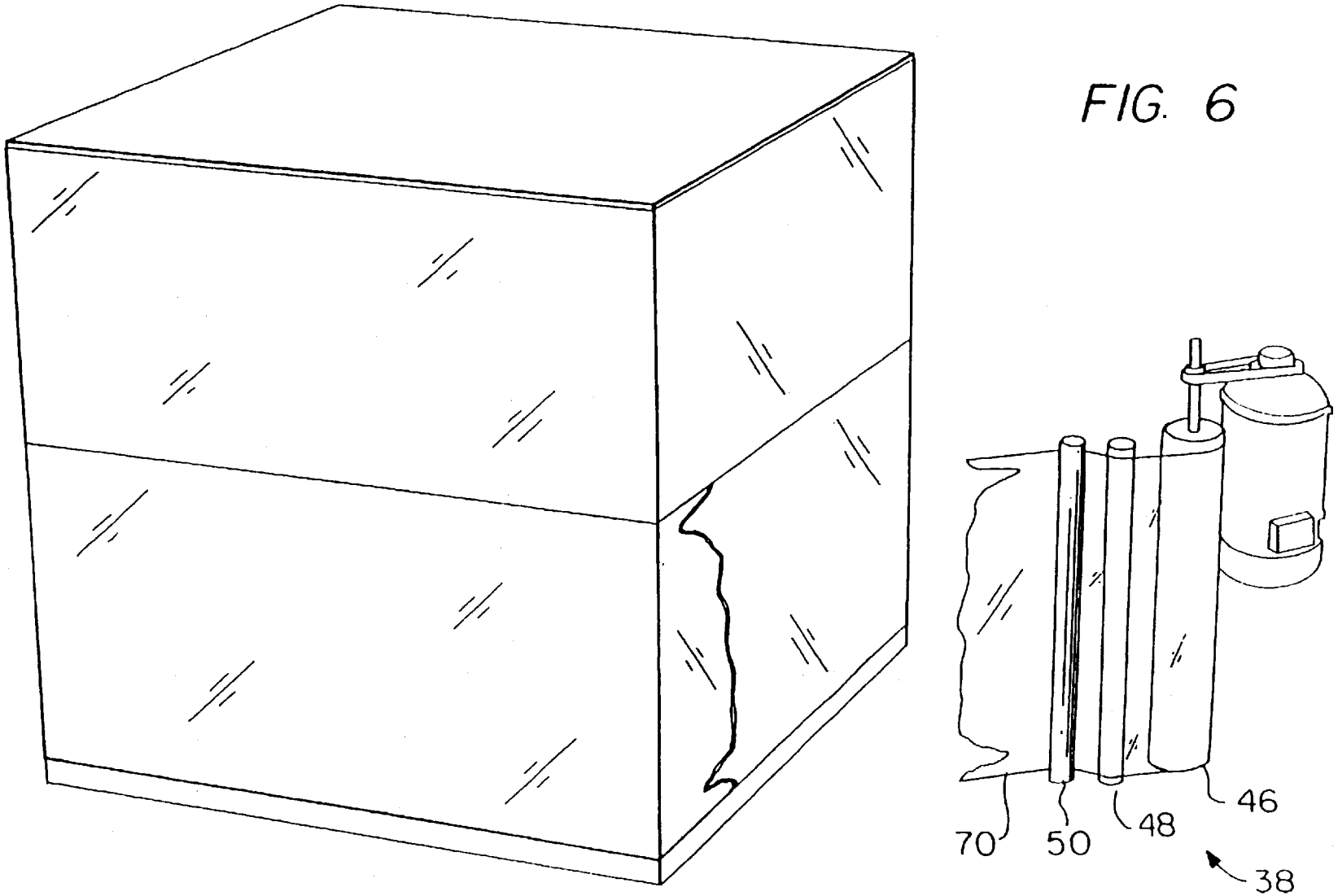
FIG. 6 is a perspective view of the arrangement shown in FIG. 5 at a period of time later than that shown in FIG. 5.

The operation starts by having the operator attach the leading end of the sheet of film web 34 to the load or a support near the load. At that starting point, the sheet of film web 34 has already been threaded through stretch wrap dispenser 38 so that, as shown in FIG. 6, a graspable tail 70 of sheet 34 extends downstream of the dispenser and, more particularly, downstream of the final dispensing roller 50 of the dispenser. The length of the tail should be sufficient to allow an operator to grab the tail and pull additional sheet from the dispenser 38 to initiate the wrapping of a new load. For current machines, the tail preferably extends at least about one-half foot and even more preferably at least about one foot from roller 50.

Load 32 is then wrapped with a sheet 34 of stretch wrap by providing relative rotation between dispenser 38 and load 32. The sheet 34 of stretch wrap is fed through stretch wrap dispenser 38, stretched in prestretching portion 40, and dispensed after having passed over dispensing rollers 48 and 50 which are preferably idler roller. The sheet 34 of stretch wrap material may be fed through the dispenser merely by the drive provided by the relative rotation between the load and dispenser. The feeding of the sheet 34 of stretch wrap also may be assisted by a motor 54 which drives the prestretch rollers 42 and 46. While powered and unpowered prestretch rollers are preferred, other alternative stretching mechanisms, such as a brake, may be used in the stretch wrapping operation.

During the last revolution of the wrapping process, a portion of the sheet 34 is selectively weakened preferably at a preselected time and preferably at a preselected position. As shown in FIG. 7, the controller 72 is informed that the load is in the last revolution of the wrapping cycle because proximity switch 74 counts revolutions of turntable 58. After a preset time, set by the operator on timer 76a, controller 72 causes film delivery drive motor 54 to decelerate, thereby decelerating turntable 58.

When this deceleration begins, another timer 76b is triggered so that after another preset time, which is determined by the operator, controller 72 sends signal to the relay/solenoid 68 of the sheet weakening device 60 so that the relay/solenoid 68 is activated, pushing on puncturing device 62, and causing rotation of puncturing device 62 from the position shown in FIG. 3 to the position shown in FIG. 4. As shown, this causes pins 64 to puncture a number of small holes through the moving film. At the same time, another time 76c is triggered.

After a predetermined time, long enough to puncture holes of a sufficient size in the film, controller 72 deactivates relay/solenoid 68, retracting the puncturing device 62 back to the position shown in FIG. 3 so that puncturing device 62 no longer contacts the film. Up until this point in the operation, the film delivery system, powered by film delivery drive motor 54, and turntable 58, powered by a turntable motor 80, are normally functioning.

After a preset time, which is determined by the operator, the timer 76c triggers a signal through controller 72 to the film delivery drive motor 54, causing the film delivery drive motor 54 to shut-off. This procedure causes film delivery drive motor 54 to act as a brake on the dispensing of film, which causes extra tension on the film because turntable 58 and the load continue to rotate and pull on the film. This stage of the operation is shown in FIG. 5, where the load is almost in its final wrapped position and the film delivery drive motor 54 is being locked up so that no more film is dispensed. The weakened film stretches and the holes get bigger.

As the load continues to rotate, it pulls on the film that is locked upstream in the film dispenser, stretching the film until it tears and snaps at the points where the puncturing device 62 has punctured a few holes and weakened the film. This final stage is shown in FIG. 6 with the load in its final wrapped position, and a graspable tail 70 extending downstream of the final dispensing roller 50 of stretch wrapped dispenser 38. The sheet 34 preferably breaks at the weakened portion when the weakened portion is in a preselected location.

The tensioning step preferably includes reducing the rate of feeding the sheet through the stretch wrap dispenser while continuing to provide relative rotation between the dispenser and the load. Other alternatives for tensioning the sheet could include increasing the rate of relative rotation between the dispenser and the load. If the tensioning step is accomplished by reducing the feed rate, this can be done not only by causing motor 54 to run at a reduced speed, but by applying a brake and/or cutting power to the motor.

It is likely that sheet 34 will continue to be dispensed from dispenser 38 even after the tensioning step is commenced because of a delay in reducing the speed or stopping the rotation of the feeding of the sheet. The relative rotation between the dispenser and the load is terminated preferably just after the sheet breaks.

It is currently preferable to have the film break immediately after the last corner of a load intersects the film web, leaving almost no film tail extending from the load. To do so, it is necessary to accommodate precisely the changes in film prestretch, wrapping force, film characteristics, load weight and turntable speed. These variables can be accommodated with multiple sensing devices to eliminate the use of time functions to determine load corner location.

In determining the position and timing of the steps of weakening a portion of the sheet and tensioning the sheet, it is preferable to transport the weakened portion of the sheet to a position downstream of the prestretch portion of the dispenser before the sheet is tensioned sufficiently to break. It is further preferable that the weakening step occurs downstream of the prestretching portion. It is also preferable that the weakened portion is transported to a position sufficiently downstream of the prestretching portion, and even more preferably to a position sufficiently downstream of the final dispensing roller or the dispenser itself, to allow a graspable tail of the sheet to extend downstream that position after the sheet is broken at the weakened portion. By providing for such a tail, the operator of the machine can easily grasp the leading end of the sheet 34 and pull the sheet forward to commence the next wrapping cycle while eliminating the difficulties of partially or fully rethreading the stretch wrap dispenser.

Additional advantages and modifications will readily occur to those skilled in the art. The invention in its broader aspects is, therefore, not limited to the specific details, representative apparatus and illustrative examples shown and described. Accordingly, departures may be made from such details without departing from the spirit or scope of the general inventive concept as defined by the appended claims and the equivalents.

What is claimed is:

1. A process for stretch wrapping a load with a sheet of stretch wrap packaging material comprising:

feeding a sheet of stretch wrap packaging material through a stretch wrap dispenser having a prestretch portion, prestretching the sheet of stretch wrap packaging material in the prestretching portion, and dispensing the sheet from the dispenser;

providing relative rotation between the dispenser and the load to wrap the stretched sheet of stretch wrap packaging material around the load;

weakening a portion of the sheet of stretch wrap packaging material at a predetermined location downstream of the prestretching portion by puncturing the sheet of stretch wrap packaging material at the predetermined location during the relative rotation between the dispenser and the load after prestretching the sheet of stretch wrap packaging material; and tensioning the weakened punctured sheet of stretch wrap packaging material during the relative rotation between the dispenser and the load to break the sheet of stretch wrap packaging material at the weakened punctured portion due to the relative rotation between the dispenser and the load.

2. The process of claim 1, wherein the tensioning step includes reducing the rate of feeding the sheet through the stretch wrap dispenser.

3. The process of claim 1, including the step of transporting the weakened portion to a position sufficiently downstream of the stretch wrap dispenser to allow a graspable tail of the sheet to extend downstream of the stretch wrap dispenser after the sheet is broken at the weakened portion.

4. The process of claim 1, including the step of transporting the weakened portion of the sheet to a position sufficiently downstream of the prestretching portion to allow a graspable tail of the sheet to extend downstream of the prestretching portion after the sheet is broken at the weakened portion.

5. The process of claim 1, wherein the stretch wrap dispenser includes a final dispensing roller and including the step of transporting the weakened portion of the sheet to a position sufficiently downstream of the final dispensing roller to allow a graspable tail of the sheet to extend downstream of the final dispensing roller after the sheet is broken at the weakened portion.

6. The process of claim 1 wherein the stretch wrap dispenser includes a final dispensing roller and the weakening step includes weakening the film at a predetermined location upstream of the final dispensing roller and including the step of transporting the weakened portion of the sheet to a position sufficiently downstream of the final dispensing roller to allow a graspable tail of the sheet to extend downstream of the final dispensing roller after the sheet is broken at the weakened portion.

7. The process of claim 1, wherein the weakening step includes puncturing the sheet in a plurality of places across the sheet.

8. The process of claim 1, wherein the weakening step includes electronically controlling the activation of a sheet weakening tool.

9. The process of claim 1 wherein the weakening step occurs in response to an actuation signal.

10. An apparatus for stretch wrapping a load with a sheet of stretch wrap packaging material comprising:

a stretch wrap dispenser for feeding and dispensing a sheet of stretch wrap packaging material from the dispenser, the stretch wrap dispenser having a prestretching portion for prestretching the sheet of stretch wrap packaging material;

means for providing relative rotation between the dispenser and the load to wrap the stretched sheet of stretch wrap packaging material around the load;

a sheet weakening device for selectively weakening a portion of the sheet of stretch wrap packaging material at a predetermined location downstream of the prestretching portion by puncturing the sheet of stretch wrap packaging material at the predetermined location during the relative rotation between the dispenser and the load after prestretching the sheet of stretch wrap packaging material; and a controller for tensioning the punctured sheet of stretch wrap packaging material during the relative rotation between the dispenser and the load to break the sheet of stretch wrap packaging material at the weakened punctured portion due to the relative rotation between the dispenser and the load.

11. The apparatus of claim 10, wherein the controller tensions the sheet by reducing the rate of feeding the sheet through the stretch wrap dispenser.

12. The apparatus of claim 10, wherein the controller permits the weakened portion of the sheet to be transported to a position sufficiently downstream of the stretch wrap dispenser to allow a graspable tail of the sheet to extend downstream of the stretch wrap dispenser after the sheet is broken at the weakened portion.

13. The apparatus of claim 10, wherein the controller permits the weakened portion of the sheet to be transported to a position sufficiently downstream of the prestretching portion to allow a graspable tail of the sheet to extend downstream of the prestretching portion after the sheet is broken at the weakened portion.

14. The apparatus of claim 10, wherein the stretch wrap dispenser includes a final dispensing roller and wherein the controller permits the weakened portion of the sheet to be transported to a position sufficiently downstream of the final dispensing roller to allow a graspable tail of sheet to extend downstream of the final dispensing roller after the sheet is broken at the weakened portion.

15. The apparatus of claim 10, wherein the stretch wrap dispenser includes a final dispensing roller, the sheet weakening device is located upstream of the final dispensing roller, and the controller permits the weakened portion of the sheet to be transported to a position sufficiently downstream of the final dispensing roller to allow a graspable tail of the sheet to extend downstream of the final dispensing roller after the sheet is broken at the weakened portion.

16. The apparatus of claim 10, wherein the sheet weakening device includes a plurality of puncturing devices for puncturing the sheet in a plurality of places across the sheet.

17. The apparatus of claim 10, wherein the controller electronically controls the activation of the sheet weakening device.

18. The apparatus of claim 10, wherein the controller electronically controls the activation of the sheet weakening device in response to an actuation signal.

19. A process for stretch wrapping a load and having at least one corner with a sheet of stretch wrap packaging material comprising:

feeding a sheet of stretch wrap packaging material through a stretch wrap dispenser having a prestretching portion, prestretching the sheet of stretch wrap packaging material in the prestretching portion, and dispensing the sheet from the dispenser;

providing relative rotation between the dispenser and the load to wrap the stretched sheet of stretch wrap packaging material around the load;

weakening a portion of the sheet of stretch wrap packaging material at a predetermined location downstream of the prestretching portion by puncturing the sheet of stretch wrap packaging material at the predetermined location during the relative rotation between the dispenser and the load after prestretching the sheet of stretch wrap packaging material; and tensioning the weakened punctured sheet of stretch wrap packaging material during the relative rotation between the dispenser and the load to break the sheet of stretch wrap packaging material at the weakened punctured portion thereby creating a tail extending from the [load] *dispenser*.

20. The process of claim 19, wherein the tensioning step includes reducing the rate of feeding the sheet through the stretch wrap dispenser.

21. The process of claim 19, including the step of transporting the weakened portion to a position sufficiently downstream of the stretch wrap dispenser to allow a graspable tail of the sheet to extend downstream of the stretch wrap dispenser after the sheet is broken at the weakened portion.

22. An apparatus for stretch wrapping a load having at least one corner with a sheet of stretch wrap packaging material comprising:

a stretch wrap dispenser for feeding and dispensing a sheet of stretch wrap packaging material from the dispenser, the stretch wrap dispenser having a prestretching portion for prestretching the sheet of stretch wrap packaging material;

means for providing relative rotation between the dispenser and the load to wrap the stretched sheet of stretch wrap packaging material around the load;

a sheet weakening device for selectively weakening a portion of the sheet of stretch wrap packaging material at a predetermined location downstream of the prestretching portion by puncturing the sheet of stretch wrap packaging material at the predetermined location during the relative rotation between the dispenser and the load after prestretching the sheet of stretch wrap packaging material; and a controller for tensioning the punctured sheet of stretch wrap packaging material during the relative rotation between the dispenser and the load to break the sheet of stretch wrap packaging material at the weakened punctured portion thereby creating a tail extending from the [load] *dispenser*,thereby minimizing the length of the tail extending from the load.

23. The apparatus of claim 22, wherein the controller tensions the sheet by reducing the rate of feeding the sheet through the stretch wrap dispenser.

24. The apparatus of claim 22, wherein the controller permits the weakened portion of the sheet to be transported to a position sufficiently downstream of the stretch wrap dispenser to allow a graspable tail of the sheet to extend downstream of the stretch wrap dispenser after the sheet is broken at the weakened portion.

*25. A rotary stretch wrapping process for stretch wrapping a load with a sheet of stretch wrap packaging material comprising:*

*feeding a sheet of stretch wrap packaging material through a stretch wrap dispenser and dispensing the sheet from the dispenser;*

*providing relative rotation between the dispenser and the load to wrap the stretched sheet of stretch wrap packaging material around the load;*

*prestretching the sheet of stretch wrap packaging material in a prestretching portion of the dispenser;*

*weakening a portion of the sheet of stretch wrap packaging material at a predetermined location downstream of the prestretching portion by puncturing the sheet of stretch wrap packaging material during the relative rotation between the dispenser and the load; and*

*tensioning the weakened sheet of stretch wrap packaging material to break the sheet of stretch wrap packaging material at the weakened portion.*

*26. A rotary stretch wrapping process for stretch wrapping a load with a sheet of stretch wrap packaging material comprising:*

*feeding a sheet of stretch wrap packaging material through a stretch wrap dispenser and dispensing the sheet from the dispenser;*

*providing relative rotation between the dispenser and the load to wrap the stretched sheet of stretch wrap packaging material around the load;*

*prestretching the sheet of stretch wrap packaging material in a prestretch portion of the dispenser;*

*weakening a portion of the sheet of stretch wrap packaging material at a predetermined location downstream of the prestretching portion by puncturing the sheet of stretch wrap packaging material during the relative rotation between the dispenser and the load; and*

*tensioning the weakened sheet of stretch wrap packaging material during relative movement between the dispenser and the load to break the sheet of stretch wrap packaging material at the weakened portion due to the relative movement.*

*27. A rotary stretch wrapping process for stretch wrapping a load with a sheet of stretch wrap packaging material comprising:*

*initiating the wrapping of each load by feeding a sheet of stretch wrap packaging material through a stretch wrap dispenser, attaching a leading end of the sheet of stretch wrap packaging material to the load to be wrapped or a support near the load to be wrapped, and dispensing the sheet from the dispenser;*

*providing relative rotation between the dispenser and the load to wrap the stretched sheet of stretch wrap packaging material around the load;*

*prestretching the sheet of stretch wrap packaging material in a prestretching portion of the dispenser;*

*weakening a portion of the sheet of stretch wrap packaging material at a predetermined location downstream of the prestretching portion by puncturing the sheet of stretch wrap packaging material during the relative rotation; and*

*tensioning the weakened sheet of stretch wrap packaging material between the dispenser and the load to break the sheet of stretch wrap packaging material at the weakened portion.*

*28. A rotary stretch wrapping process for stretch wrapping a load with a sheet of stretch wrap packaging material comprising:*

*feeding a sheet of stretch wrap packaging material through a stretch wrap dispenser and dispensing the sheet from the dispenser;*

*providing relative rotation between the dispenser and the load to wrap the stretched sheet of stretch wrap packaging material around the load;*

*prestretching the sheet of stretch wrap packaging material in a prestretching portion of the dispenser;*

*weakening a portion of the sheet of stretch wrap packaging material at a predetermined location downstream of the prestretching portion by puncturing the sheet of stretch wrap packaging material during the relative rotation; and*

*transporting the weakened portion of the sheet of stretch wrap material downstream of the predetermined location; and*

*tensioning the weakened sheet of stretch wrap packaging material to break the sheet of stretch wrap packaging material at the weakened portion.*

*29. A rotary stretch wrapping process for stretch wrapping a load with a sheet of stretch wrap packaging material comprising:*

*feeding a sheet of stretch wrap packaging material through a stretch wrap dispenser and dispensing the sheet from the dispenser;*

*providing relative rotation between the dispenser and the load to wrap the stretched sheet of stretch wrap packaging material around the load;*

*prestretching the sheet of stretch wrap packaging material in a prestretching portion of the dispenser;*

*weakening a portion of the sheet of stretch wrap packaging material at a predetermined location downstream of the prestretching portion by puncturing the sheet of stretch wrap packaging material during the relative rotation between the dispenser and the load; and*

*tensioning the weakened sheet of stretch wrap packaging material during relative movement between the dispenser and the load to break the sheet of stretch wrap packaging material at the weakened portion due to the relative movement.*

*30. A rotary stretch wrapping process for stretch wrapping a load with a sheet of stretch wrap packaging material comprising:*

*feeding a sheet of stretch wrap packaging material through a stretch wrap dispenser and dispensing the sheet from the dispenser;*

*providing relative rotation between the dispenser and the load to wrap the stretched sheet of stretch wrap packaging material around the load;*

*prestretching the sheet of stretch wrap packaging material in a prestretching portion of the dispenser;*

*weakening a portion of the sheet of stretch wrap packaging material at a predetermined location downstream of the prestretching portion by puncturing the sheet of stretch wrap packaging material during the relative rotation and after wrapping the stretched sheet of stretch wrap packaging material around the load;*

*transporting the weakened portion of the sheet of stretch wrap material downstream of the predetermined location; and*

*tensioning the weakened sheet of stretch wrap packaging material to break the sheet of stretch wrap packaging material at the weakened portion.*

*31. A rotary stretch wrapping apparatus for stretch wrapping a load with a sheet of stretch wrap packaging material comprising:*

*a stretch wrap dispenser for feeding and dispensing a sheet of stretch wrap packaging material from the dispenser;*

*means for providing relative rotation between the dispenser and the load to wrap the stretched sheet of stretch wrap packaging material around the load;*

*a prestretch portion of the dispenser for prestretching the sheet of stretch wrap packaging material;*

*a sheet weakening device for selectively weakening a portion of the sheet of stretch wrap packaging material at a predetermined location downstream of the prestretching portion by puncturing the sheet of stretch wrap packaging material during the relative rotation; and*

*a controller for permitting tensioning of the sheet of stretch wrap packaging material to break the sheet of stretch wrap packaging material at the weakened portion.*

*32. A rotary stretch wrapping apparatus for stretch wrapping a load with a sheet of stretch wrap packaging material comprising:*

*a stretch wrap dispenser for feeding and dispensing a sheet of stretch wrap packaging material from the dispenser;*

*means for providing relative rotation between the dispenser and the load to wrap the stretched sheet of stretch wrap packaging material around the load;*

*a prestretch portion of the dispenser for prestretching the sheet of stretch wrap packaging material;*

*a sheet weakening device for selectively weakening a portion of the sheet of stretch wrap packaging material at a predetermined location downstream of the prestretching portion by puncturing the sheet of stretch wrap packaging material during the relative rotation; and*

*a controller for permitting tensioning of the sheet of stretch wrap packaging material so that the sheet of stretch wrap packaging material can be broken at the*

*weakened portion during relative movement between the dispenser and the load.*

*33. A rotary stretch wrapping apparatus for stretch wrapping a load with a sheet of stretch wrap packaging material comprising:*

*a stretch wrap dispenser for feeding and dispensing a sheet of stretch wrap packaging material from the dispenser;*

*means for providing relative rotation between the dispenser and the load to wrap the sheet of stretch wrap packaging material around the load;*

*a prestretch portion of the dispenser for prestretching the sheet of stretch wrap packaging material;*

*a sheet weakening device for selectively weakening a portion of the sheet of stretch wrap packaging material at a predetermined location downstream of the prestretching portion by puncturing the sheet of stretch wrap packaging material during the relative rotation; and*

*a controller for operating the rotary stretch wrapping apparatus in a semi-automatic mode to initiate wrapping subsequent to attaching a leading end of the sheet of stretch wrap packaging material to the load or a support near the load prior to wrapping each load, and for permitting tensioning of the sheet of stretch wrap packaging material between the dispenser and the load to break the sheet of stretch wrap packaging material at the weakened portion.*

*34. A rotary stretch wrapping apparatus for stretch wrapping a load with a sheet of stretch wrap packaging material comprising:*

*a stretch wrap dispenser for feeding and dispensing a sheet of stretch wrap packaging material from the dispenser;*

*means for providing relative rotation between the dispenser and the load to wrap the stretched sheet of stretch wrap packaging material around the load;*

*a prestretch portion of the dispenser for prestretching the sheet of stretch wrap packaging material;*

*a sheet weakening device for selectively weakening a portion of the sheet of stretch wrap packaging material at a predetermined location downstream of the prestretching portion by puncturing the sheet of stretch wrap packaging material during the relative rotation; and*

*a controller for permitting tensioning of the weakened sheet of stretch wrap packaging material between the dispenser and the load to break the sheet of stretch wrap packaging material at the weakened portion thereby creating a graspable tail of packaging material extending from the dispenser.*

*35. A rotary stretch wrapping apparatus for stretch wrapping a load having at least one corner with a sheet of stretch wrap packaging material comprising:*

*a stretch wrap dispenser for feeding and dispensing a sheet of stretch wrap packaging material from the dispenser;*

*means for providing relative rotation between the dispenser and the load to wrap the stretched sheet of stretch wrap packaging material around the load;*

*a prestretch portion of the dispenser for prestretching the sheet of stretch wrap packaging material;*

*a sheet weakening device for selectively weakening a portion of the sheet of stretch wrap packaging material at a predetermined location downstream of the prestretching portion by puncturing the sheet of stretch wrap packaging material during the relative rotation; and*

*a controller for permitting tensioning of the weakened portion of stretch wrap packaging material downstream of the predetermined location and for permitting tensioning of the weakened sheet of stretch wrap packaging material to break the sheet of stretch wrap packaging material at the weakened portion.*

*36. A rotary stretch wrapping apparatus for stretch wrapping a load having at least one corner with a sheet of stretch wrap packaging material comprising:*

*a stretch wrap dispenser for feeding and dispensing a sheet of stretch wrap packaging material from the dispenser;*

*means for providing relative rotation between the dispenser and the load to wrap the stretched sheet of stretch wrap packaging material around the load;*

*a prestretch portion of the dispenser for prestretching the sheet of stretch wrap packaging material;*

*a sheet weakening device for selectively weakening a portion of the sheet of stretch wrap packaging material at a predetermined location downstream of the prestretching portion by puncturing the sheet of stretch wrap packaging material during the relative rotation and after wrapping the stretched sheet of stretch wrap packaging material around the load; and*

*a controller for permitting transporting of the weakened portion of stretch wrap packaging material downstream of the predetermined location and for permitting tensioning of the weakened sheet of stretch wrap packaging material to break the sheet of stretch wrap packaging material at the weakened portion.*

*37. A rotary stretch wrapping process for stretch wrapping a load with a sheet of stretch wrap packaging material comprising:*

*feeding a sheet of stretch wrap packaging material through a stretch wrap dispenser having a prestretch portion, prestretching the sheet of stretch wrap packaging material in the prestretch portion, and dispensing the sheet from the dispenser;*

*providing relative rotation between the dispenser and the load to wrap the stretched sheet of stretch wrap packaging material around the load;*

*weakening a portion of the sheet of stretch wrap packaging material at a predetermined location downstream of the prestretching portion by puncturing the sheet of stretch wrap packaging material at the predetermined location during the relative rotation between the dispenser and the load and after prestretching the sheet of stretch wrap packaging material; and*

*tensioning the weakened punctured sheet of stretch wrap packaging material to break the sheet of stretch wrap packaging material at the weakened punctured portion.*

*38. A rotary stretch wrapping process for stretch wrapping a load with a sheet of stretch wrap packaging material comprising:*

*feeding a sheet of stretch wrap packaging material through a stretch wrap dispenser having a prestretch portion, prestretching the sheet of stretch wrap packaging material in the prestretch portion, and dispensing the sheet from the dispenser;*

*providing relative rotation between the dispenser and the load to wrap the stretched sheet of stretch wrap packaging material around the load;*

*weakening a portion of the sheet of stretch wrap packaging material at a predetermined location downstream of the prestretching portion by puncturing the sheet of stretch wrap packaging material at the predetermined location during the relative rotation between the dispenser and the load; and*

*tensioning the weakened punctured sheet of stretch wrap packaging material to break the sheet of stretch wrap packaging material at the weakened punctured portion.*

*39. A rotary stretch wrapping apparatus for stretch wrapping a load with a sheet of stretch wrap packaging material comprising:*

*a stretch wrap dispenser for feeding and dispensing a sheet of stretch wrap packaging material from the dispenser, the stretch wrap dispenser having a prestretching portion for prestretching the sheet of stretch wrap packaging material;*

*means for providing relative rotation between the dispenser and the load to wrap the stretched sheet of stretch wrap packaging material around the load;*

*a sheet weakening device for selectively weakening a portion of the sheet of stretch wrap packaging material at a predetermined location downstream of the prestretching portion by puncturing the sheet of stretch wrap packaging material at the predetermined location during the relative rotation between the dispenser and the load after prestretching the sheet of stretch wrap packaging material; and*

*a controller for permitting tensioning of the sheet of stretch wrap packaging material to break the sheet of stretch wrap packaging material can be broken at the weakened punctured portion.*

*40. A rotary stretch wrapping apparatus for stretch wrapping a load with a sheet of stretch wrap packaging material comprising:*

*a stretch wrap dispenser for feeding the dispensing a sheet of stretch wrap packaging material from the dispenser, the stretch wrap dispenser having a prestretching portion for prestretching the sheet of stretch wrap packaging material;*

*means for providing relative rotation between the dispenser and the load to wrap the stretched sheet of stretch wrap packaging material around the load;*

*a sheet weakening device for selectively weakening a portion of the sheet of stretch wrap packaging material at a predetermined location downstream of the prestretching portion by puncturing the sheet of stretch wrap packaging material at the predetermined location during the relative rotation between the dispenser and the load; and*

*a controller for permitting tensioning of the sheet of stretch wrap packaging material to break the sheet of stretch wrap packaging material can be broken at the weakened punctured portion.*

* * * * *

UNITED STATES PATENT AND TRADEMARK OFFICE

CERTIFICATE OF CORRECTION

PATENT NO. : RE 37,237 E
DATED : June 26, 2001
INVENTOR(S) : Patrick R. Lancaster, III et al.

It is certified that error appears in the above-identified patent and that said Letters Patent is hereby corrected as shown below:

Column 9,
Lines 39-41, delete lines 39-41 in their entirety;
Line 43, after "material" insert -- between the dispenser and the load --; and
Line 44, after "portion" insert -- thereby creating a graspable tail of packaging material extending from the dispenser --.
Lines 61-62, after "rotation" delete "between the dispenser and the load; and";
Lines 64-65, after "material" delete "during relative movement between the dispenser and the load"; and
Lines 66-67, delete "due to the relative movement".

Column 12,
Line 4, "tensioning" should read -- transporting --.

Signed and Sealed this

Thirteenth Day of April, 2004

JON W. DUDAS
*Acting Director of the United States Patent and Trademark Office*